US009146557B1

(12) United States Patent
Ahmed et al.

(10) Patent No.: US 9,146,557 B1
(45) Date of Patent: Sep. 29, 2015

(54) ADAPTIVE CONTROL METHOD FOR UNMANNED VEHICLE WITH SLUNG LOAD

(71) Applicant: KING FAHD UNIVERSITY OF PETROLEUM AND MINERALS, Dhahran (SA)

(72) Inventors: Ghufran Ahmed, Dammam (SA); Sami El Ferik, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 205 days.

(21) Appl. No.: 14/260,096

(22) Filed: Apr. 23, 2014

(51) Int. Cl.
*B64C 19/00* (2006.01)
*B64C 17/00* (2006.01)
*B64B 1/20* (2006.01)
(Continued)

(52) U.S. Cl.
CPC .................. *G05D 1/00* (2013.01); *B64C 19/00* (2013.01); *B64C 39/024* (2013.01); *B64D 9/00* (2013.01); *G05D 1/08* (2013.01); *G05D 1/085* (2013.01); *G05D 1/0808* (2013.01); *G05D 1/0816* (2013.01); *G05D 1/0825* (2013.01); *G05D 1/10* (2013.01); *G05D 1/101* (2013.01); *B64C 17/00* (2013.01); *B64C 2201/00* (2013.01); *B64C 2201/128* (2013.01); *B64C 2201/14* (2013.01); *B64D 1/22* (2013.01)

(58) Field of Classification Search
CPC ..... G05D 1/101; G05D 1/0825; G05D 1/085; G05D 1/0816; G05D 1/0808; G05D 1/08; G05D 1/10; B64D 1/22; B64C 17/00; B64C 19/00; B64C 2201/00

USPC ............. 701/3, 4, 10; 703/2, 6, 8; 700/28–32, 700/47–50; 244/8, 17.11, 177, 181, 75.1; 706/2, 14, 16, 905, 913
See application file for complete search history.

(56) References Cited

U.S. PATENT DOCUMENTS 4,741,501 A * 5/1988 Clelford et al. ............. 244/17.13
5,428,543 A * 6/1995 Gold et al. ........................ 701/5
(Continued)

FOREIGN PATENT DOCUMENTS

EP          1 901 153 A1    3/2008
IN        201102821 I3      11/2011

OTHER PUBLICATIONS

Nodland et al., "Neural Network-Based Optimal Adaptive Output Feedback Control of a Helicopter UAV," IEEE Transactions on Neural Networks and Learning Systems, vol. 24, No. 7, Jul. 2013, pp. 1061-1073 (date of publication: Mar. 26, 2013).

(Continued)

*Primary Examiner* — Russell Frejd
(74) *Attorney, Agent, or Firm* — Richard C. Litman (57) ABSTRACT

The adaptive control method for an unmanned vehicle with a slung load utilizes a feedback linearization controller (FLC) to perform vertical take off, hovering and landing of an unmanned aerial vehicle with a slung load, such as a quadrotor drone or the like. The controller includes a double loop architecture, where the overall controller includes an inner loop having an inner controller which is responsible for controlling the attitude angles and the altitude, and an outer loop having an outer controller responsible for providing the inner loop inner controller with the desired angle values. States, such as including roll, pitch, yaw and/or altitude, are selected as outputs and the feedback linearization technique is used.

6 Claims, 5 Drawing Sheets

(51) Int. Cl.
*G05D 1/08* (2006.01)
*G05D 1/10* (2006.01)
*G05D 1/00* (2006.01)
*B64D 9/00* (2006.01)
*B64C 39/02* (2006.01)
*B64D 1/22* (2006.01)

(56) References Cited

U.S. PATENT DOCUMENTS

| | | | | |
|---|---|---|---|---|
| 6,189,836 | B1 * | 2/2001 | Gold et al. | 244/191 |
| 6,516,309 | B1 * | 2/2003 | Eberhart et al. | 706/27 |
| 6,532,454 | B1 * | 3/2003 | Werbos | 706/14 |
| 7,194,397 | B1 | 3/2007 | Bush | |
| 7,370,829 | B2 * | 5/2008 | Badre-Alam et al. | 244/17.13 |
| 8,104,720 | B2 * | 1/2012 | Hirvonen et al. | 244/194 |
| 8,185,259 | B2 * | 5/2012 | Omar | 701/3 |
| 8,190,307 | B2 * | 5/2012 | Omar | 701/4 |
| 8,532,846 | B2 * | 9/2013 | Tollenaere et al. | 701/3 |
| 2007/0299794 | A1 | 12/2007 | El-Damhougy | |
| 2009/0033259 | A1 * | 2/2009 | Cesario et al. | 318/400.04 |
| 2010/0279255 | A1 | 11/2010 | Williams, II | |
| 2011/0084162 | A1 | 4/2011 | Goossen et al. | |
| 2012/0072075 | A1 | 3/2012 | Choe et al. | |
| 2012/0095621 | A1 | 4/2012 | Zhu et al. | |
| 2013/0054054 | A1 | 2/2013 | Tollenaere et al. | |

OTHER PUBLICATIONS

Lee et al., "Design of a Neural Network Controller for a Slung-Load System Lifted by 1 Quad-Rotor," Journal of Automation and Control Engineering, vol. 3, No. 1, Feb. 2015, pp. 9-14, retrieved on Mar. 15, 2014.

* cited by examiner

ADAPTIVE CONTROL METHOD FOR UNMANNED VEHICLE WITH SLUNG LOAD

BACKGROUND OF THE INVENTION

1. Field of the Invention

The present invention relates to control for aerial vehicles, and particularly to an adaptive control method for aerial vehicles carrying slung, or suspended, loads.

2. Description of the Related Art

Figure 4:
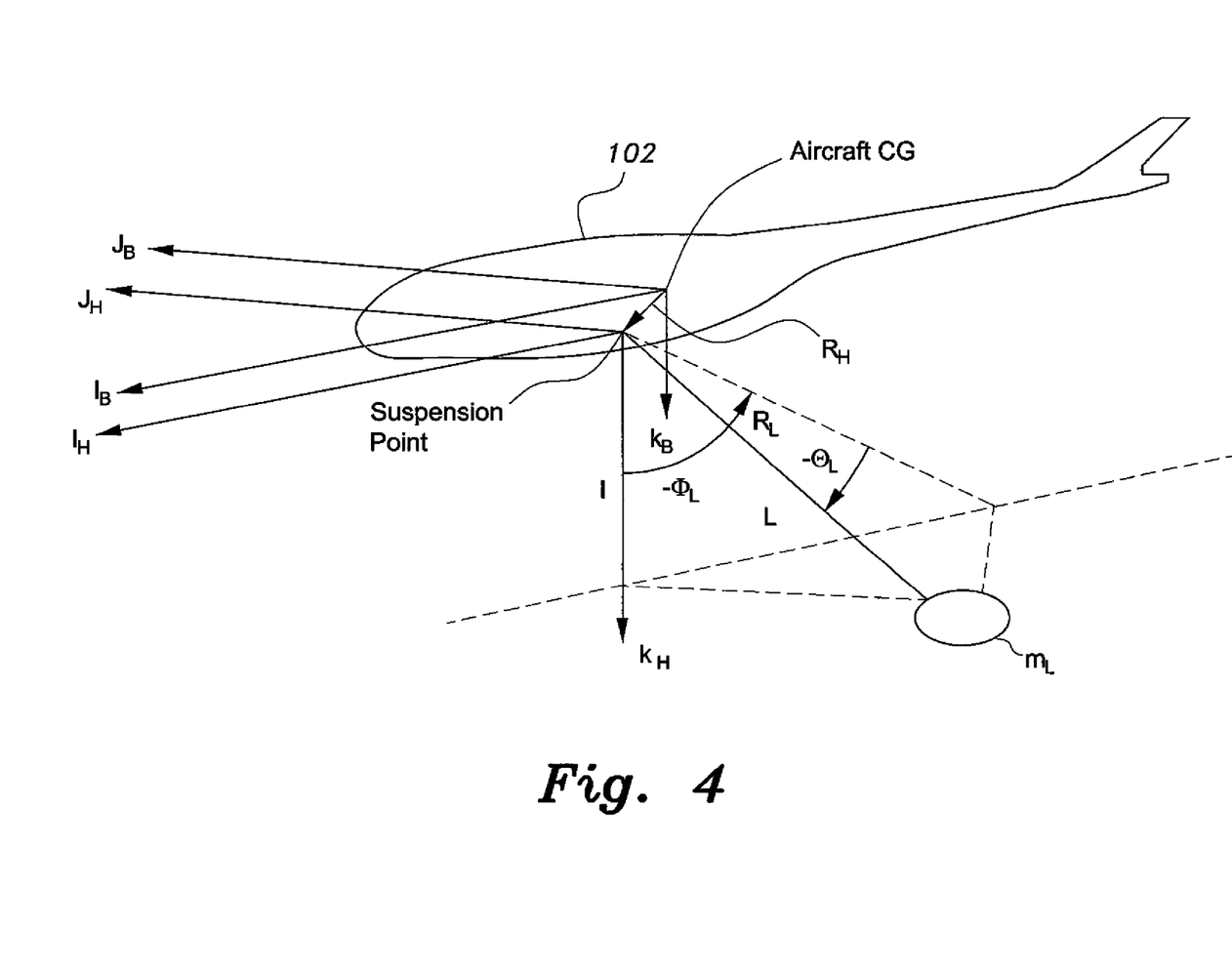
FIG. 4 diagrammatically illustrates an exemplary aircraft for modeling dynamics of an aerial vehicle with a slung load.
Figure 5:
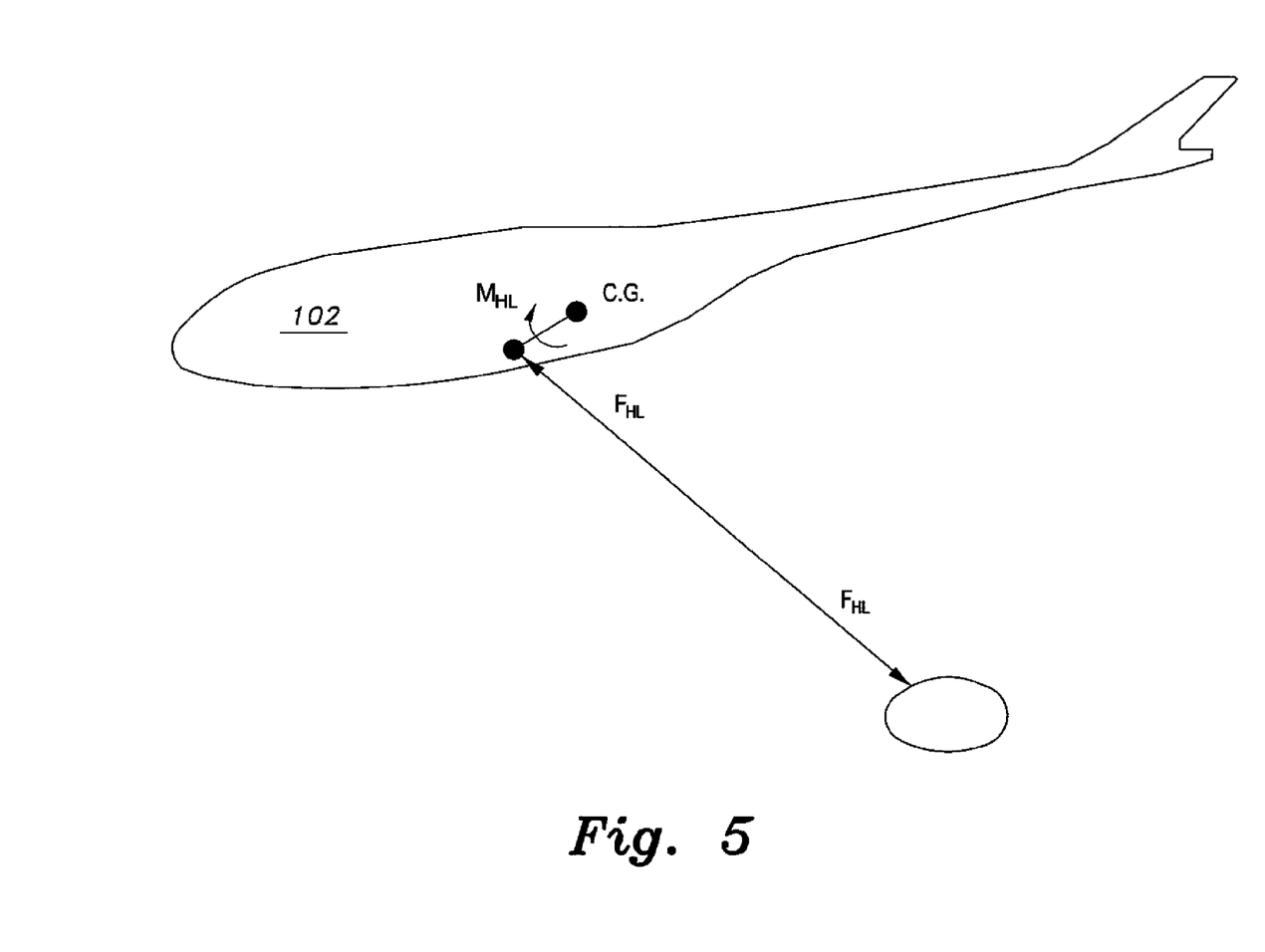
FIG. 5 diagrammatically illustrates the exemplary aircraft of FIG. 4 for modeling dynamics of an aerial vehicle with a slung load.

FIGS. 4 and 5 illustrate an exemplary aerial vehicle 102. In relation to discussing the aerial vehicle 102 with reference to FIGS. 4 and 5, the symbols, letters, characters and references used are for purposes of the background description of the related art only, and the meaning or use of such same or similar symbols, letters, characters and references may differ as otherwise described in the specification. The aerial vehicle 102 is modeled as a rigid body with six degrees of freedom. The twelve aerial vehicle states include translational velocities (u, v, w) angular velocities (p, q, r), Euler angles ($\Phi$, $\theta$, $\phi$) and the aerial vehicle 102's position (x, y, z). An external load is modeled as a point mass that behaves like a spherical pendulum suspended from a single point. The cable for the external load is assumed to be inelastic and with no mass. The geometry and the relevant coordinate systems are shown in FIG. 4. The unit vectors $i_H$, $j_H$, $k_H$ of the "hook" coordinate system always remain parallel to those of the body axis system of aerial vehicle 102. The position of the load is described by the two angles $\Phi_L$ and $\theta_L$, where $\theta_L$ is load angle in the x-z plane, and where $\Phi_L$ is the load oscillation angle out of the x-z plane. Therefore, the position vector $R_L$ of the load with respect to the suspension point is given by:

$$R_L = L\cos(\theta_L)\sin(\Phi_L)i_H + L\sin(\theta_L)j_H + L\cos(\theta_L)\cos(\Phi_L)k_H. \tag{1}$$

The position vector $R_H$ of the hook with respect to the aerial vehicle 102's center of gravity (e.g.) is given by:

$$R_H = x_H i_H + y_H j_H + z_H k_H. \tag{2}$$

The absolute velocity $V_L$ of the load is given by:

$$V_L = V_{cg} + \dot{R} + \Omega \times R, \tag{3}$$

where $V_{cg}$ is the absolute velocity of the center of mass of the aerial vehicle 102, $R = R_L + R_H$ is the position vector of the load with respect to the center of mass of the aerial vehicle 102, and $\Omega = p i_H + q j_H + r k_H$ is the angular velocity of the aerial vehicle 102. The absolute acceleration $a_L$ of the load is:

$$a_L = \dot{V}_L + \Omega \times V_L. \tag{4}$$

The unit vector in the direction of the gravity force is given by:

$$K_g = -\sin(\theta)i_H + \sin(\Phi)\cos(\theta)j_H + \cos(\phi)\cos(\theta)k_H. \tag{5}$$

Beside the gravity, there is an aerodynamic force applied on the point mass load. Since the analysis in the background description is restricted to the aerial vehicle 102's motion near hover, the aerodynamics loads on the load will be neglected.

The equations of motion of the load are written by enforcing moment equilibrium about the suspension point, that is, in matrix form:

$$R_L \times (-m_L a_L + m_L g k_g) = 0. \tag{6}$$

The above equation gives three scalar equations of second order, only the equations in the x and y directions are retained, which represent the equations of motion of the load.

The suspended load introduces additional terms in the rigid body force and moment equations of motion of the aerial vehicle 102, namely load forces and load dynamics. The force and moment loads, $F_{HL}$ and $M_{HL}$, are shown in FIG. 5. The force that the load exerts on the aerial vehicle 102 is given by:

$$F_{HL} = -m_L a_L + m_L g k_g. \tag{7}$$

The additional moment $M_{HL}$ is therefore given by:

$$M_{HL} = R_H \times F_{HL}. \tag{8}$$

The above equations give highly nonlinear expressions. These equations cannot be used for stability analysis. Therefore, they must be linearized around the trim condition. To be able to perform the linearization process, the trim values of the aerial vehicle 102 and the load must be determined.

The obtained equations are nonlinear and complicated. For design purposes, these equations are linearized about the hovering conditions. Near hover, the forward speed is nearly zero (i.e., $u_0=0$). Assuming that the aerial vehicle 102's roll angle is also zero, even with the effect of the load on the aerial vehicle 102 (i.e., $\Phi_0=0$) simplifies the analysis. At this condition, the load trim equations give the following trim values:

$$\theta_{Lo} 0 \text{ and } \Phi_{Lo} = -\theta_o. \tag{9}$$

Imposing the above results to the linearized load equations obtains the following equations of motion for the load:

$$g\theta_L - g\cos(\theta_o)\phi + y_h\dot{q} + \dot{V} + L\ddot{\theta}_L = 0. \tag{10}$$

$$L\ddot{\Phi}_L + g\Phi_L + g\theta + (x_h - L\sin(\theta_o))\cos(\theta_o)\dot{p} + z_h\sin(\theta_o)\dot{r} + L\cos(\theta_o)\sin(\theta_o)\dot{r} + \cos(\theta_o)\dot{U} + \sin(\theta_o)\dot{W} = 0. \tag{11}$$

The forces exerted by the load on the aerial vehicle 102 are:

$$F_x = m_L(-g\cos[\theta_o]\theta - xh\dot{p} + L\sin[\theta_o]\dot{p} - \dot{U}[t] - L\cos[\theta_o]\ddot{\Phi}_L),$$

$$F_y = m_L(g\cos[\theta_o]\Phi - y_h\dot{q} - \dot{V} - L\ddot{\theta}_L) \text{ and}$$

$$F_z = m_L(-g\sin[\theta_o]\theta - (z_h + L\cos[\theta_o])\dot{r} - \dot{W} - L\sin[\theta_o]\ddot{\Phi}_L). \tag{12}$$

The moments in the x-y-z directions are: $\phi$ $$M_x = m_L \begin{pmatrix} -gy_h\sin[\theta_o]\theta - gz_h\cos(\theta_o)\varphi + y_h z_h \dot{q} \\ -y_h(z_h + Ly_h\cos[\theta_o])\dot{r} + z_h\dot{V} - y_h\dot{W} \\ +Lz_h\ddot{\theta} - Ly_h\sin[\theta_o]\ddot{\varphi}_L \end{pmatrix} \tag{13}$$

$$M_y = m_L \begin{pmatrix} -gz_h\cos[\theta_o]\theta - gx_h\sin[\theta_o]m_L\theta - x_h z_h m_L\dot{p} \\ +Lz_h\sin[\theta_o]\dot{p} + x_h z_h \dot{r} + Lx_h\cos[\theta_o]\dot{r} - z_h\dot{U} \\ +x_h\dot{W} - Lz_h\cos[\theta_o]\ddot{\varphi}_L + Lx_h\sin[\theta_o]\ddot{\varphi}_L \end{pmatrix}$$

and $$M_z = m_L \begin{pmatrix} gy_h\cos[\theta_o]\theta + gx_h\cos(\theta_o)\varphi + x_h y_h \dot{p} \\ -Ly_h\sin[\theta_o]\dot{p} - x_h y_h \dot{q} + y_h\dot{U} - x_h\dot{V} \\ -Lx_h\ddot{\theta}_L + Ly_h\cos[\theta_o]\ddot{\varphi}_L \end{pmatrix}.$$

These equations are linear and can be formulated in a state space form. If the load state vector is defined as $x_L = [\dot{\Phi}_L \ \dot{\theta}_L \ \Phi_L \ \theta_L]^T$, the load equations in state space can be written as:

$$E_L\dot{x} = A_L x, \tag{14}$$

where x is the state vector for the load and the aerial vehicle 102 (i.e., $x = [x_H \ x_L]$).

Similarly, the effect of the load on the aerial vehicle 102 force terms can be written also as:

$$\begin{bmatrix} F_{HL} \\ M_{HL} \end{bmatrix} = E_{HL}\dot{x} + A_{HL}x. \quad (15)$$

The linearized equations of motion of the aerial vehicle 102 and the load can be written in the following state space forms:

$$\dot{x} = \begin{bmatrix} \dot{x}_h \\ \dot{x}_L \end{bmatrix} = Ax + B\eta. \quad (16)$$

A great deal of effort has been made for modeling the slung load and studying its effect on dynamics of aerial vehicles. Examples of automatic control for vehicles, such as helicopters, with slung loads include a single-cable dynamic model developed using a straightforward application of Lagrange equations, and an expanded version of this model, which includes two tandem cables. However, such a formulation was based on the Newton-Euler equations of motion for small perturbations separated into longitudinal and lateral sets. The disadvantage was that aerodynamic forces on the cables and the load were neglected, as were the helicopter rotor dynamic modes.

Such work, though promising, is not only based on classical control techniques, but is difficult to apply to modern unmanned aerial vehicles, such as quadrotor drones and the like. It would be desirable to provide an anti-swing controller for a quadrotor aerial vehicle slung load system near hover flight. Such a controller should be based on time-delayed feedback of the load swing angles. The output from such a controller would be additional displacements that are added to the vehicle trajectory in the longitudinal and lateral directions, for example.

Thus, an adaptive control method for an unmanned vehicle with a slung load addressing the aforementioned problems is desired.

SUMMARY OF THE INVENTION

In the present adaptive control method for an unmanned vehicle with a slung load, a feedback linearization controller (FLC) is used to perform vertical take off, hovering and landing of an unmanned vehicle with a slung load, such as a quadrotor drone or the like. To achieve hover condition, the attitude angles and the position have to be stabilized. The outputs of the controller are the set of variables $(x, y, z, \phi, \theta, \psi)$, where x, y and z are three-dimensional Cartesian coordinates, $\phi$ represents roll, $\theta$ represents pitch, and $\psi$ represents yaw. However, selecting all six outputs makes the system under-actuated, as there are only four inputs. Additionally, a coupling problem also exists, thus the output vector in the present method is selected to simply be $(\phi, \theta, \psi, z)$, where the Cartesian z-coordinate represents altitude. Thus, the present control method involves double loop architecture, where the overall controller includes an inner loop having an inner controller which is responsible for controlling the attitude angles and the altitude, and an outer loop having an outer controller responsible for providing the inner controller of the inner loop with the desired angle values. The inner controller of the inner loop needs to be much faster than the outer controller of the outer loop in order to achieve stability. These four states $(\phi, \theta, \psi, z)$, or three states $(\phi, \theta, z)$, are selected as outputs and the feedback linearization technique is used.

As will be described in greater detail below, the inner controller of the inner loop utilizes a two layer neural network. Essentially, as will be described in greater detail below, the overall adaptive control method includes the following steps:

(a) establishing a feedback linear controller, such that $f(x) = M_b(\ddot{x}_{a_d} + \Lambda\dot{e}_{x_a}) C_b(\dot{x}_{a_d} + \Lambda e_{x_a}) + D_b\dot{x}_a + G_b$, where f(x) is a control dynamics input for an unmanned aerial vehicle, $x_{a_d}$ is a vector representing roll, pitch, yaw and altitude for the unmanned aerial vehicle based on a corresponding trajectory, $M_b$ is an inertia matrix associated with the unmanned aerial vehicle, $C_b$ is a centrifugal force and coriolis force matrix associated with the unmanned aerial vehicle, $D_b$ is a drag force matrix associated with the unmanned aerial vehicle, and $G_b$ is a gravitational vector, $\dot{x}_a$ being a velocity vector such that $$\dot{x}_a = \begin{pmatrix} \dot{\phi} \\ \dot{\theta} \\ \dot{\psi} \\ \dot{z} \end{pmatrix},$$

where $\phi$ represents a roll angle of the unmanned aerial vehicle, $\theta$ represents a pitch angle of the unmanned aerial vehicle, $\psi$ represents a yaw angle of the unmanned aerial vehicle, and z represents an altitude of the unmanned aerial vehicle, $e_{x_a}$ representing control error, and $\Lambda$ being a positive definite constant matrix such that $y = \dot{e}_{x_a} + \Lambda e_{x_a}$, where y is a filtered tracking error, and x is a vector defined as $x = [e_{x_a}^T \dot{e}_{x_a}^T x_{a_d}^T \dot{x}_{a_d}^T \ddot{x}_{a_d}^T]^T$, where T is a period of a periodic orbit of the slung load;

(b) establishing a two level neural network such that $f(x) = W^T\sigma(V^Tx) + \epsilon$, where W and V are neural network weights, $\sigma$ represents the sigmoid function, and $\epsilon$ being a known bound;

(c) calculating a neural network estimate of f(x), $\hat{f}(x)$, as $\hat{f}(x) = \hat{W}^T\sigma(\hat{V}^Tx)$, where $\hat{W}$ and $\hat{V}$ are actual values of the neural network weights W and V, respectively, given by a tuning algorithm;

(d) providing a control input $\tau$ for the unmanned aerial vehicle as $\tau = \hat{W}^T\sigma(\hat{V}^Tx) + K_v y$, where $K_v$ is a feedforward gain; and (e) providing additional anti-swing control input to the unmanned aerial vehicle to correct for a slung load as $x_{cor} = K_{xc}L\phi_L(t-\tau_{xc})$ and $y_{cor} = K_{yc}L\phi_L(t-\tau_{yc})$, wherein $x_{cor}$ and $y_{cor}$ are additional longitudinal and lateral displacements, respectively, $K_{xc}$ and $K_{yc}$ are, respectively, longitudinal and lateral feedback gains, L is a load cable length, $\phi_L$ is a load angle in an x-z plane, t is time, and $\tau_{xc}$ and $\tau_{yc}$ are, respectively, longitudinal and lateral time delays introduced in the feedback of the load angle.

These and other features of the present invention will become readily apparent upon further review of the following specification.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
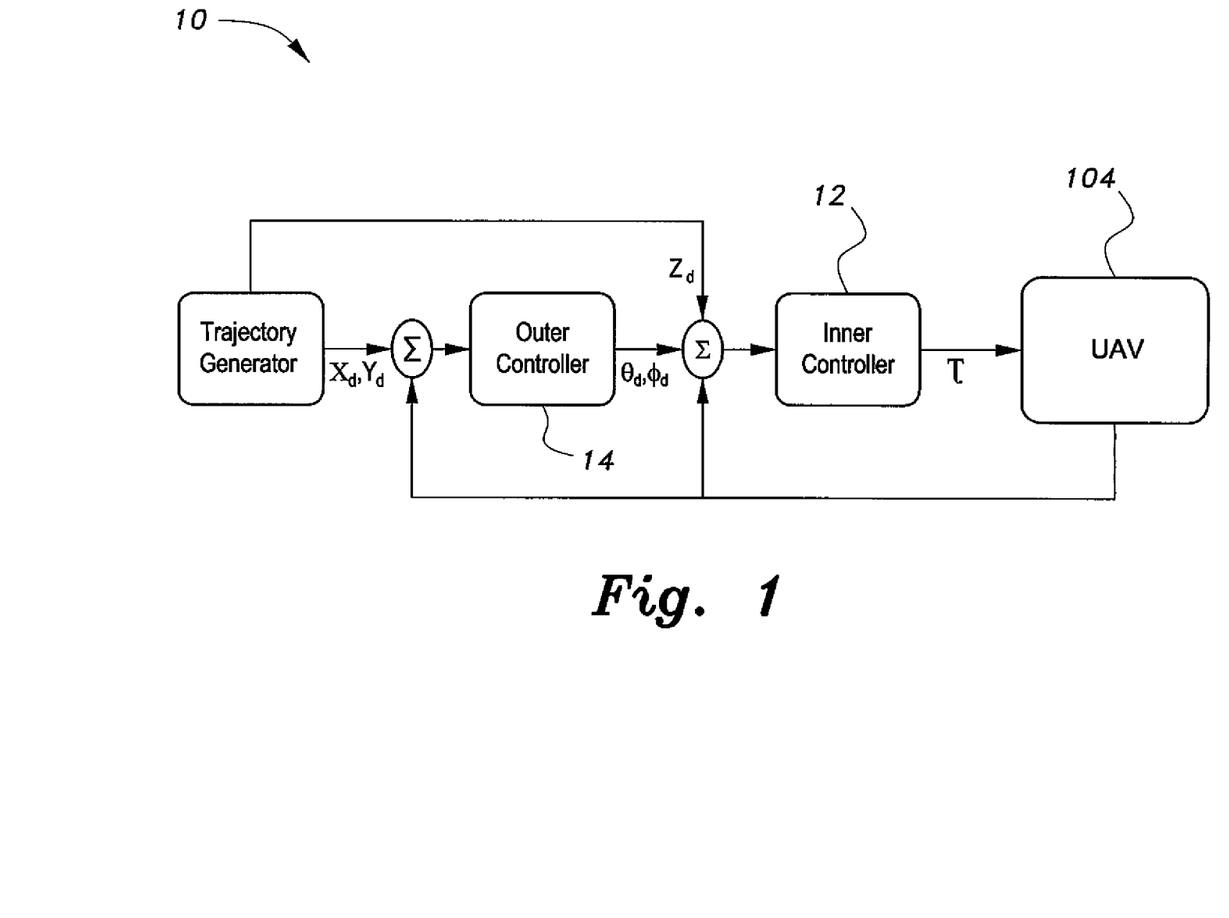
FIG. 1 is a block diagram illustrating an overview of an embodiment of an adaptive control method for an unmanned aerial vehicle (UAV) with a slung load according to the present invention.

In the present method, a feedback linearization controller (FLC) is used to perform vertical take off, hovering and landing of an unmanned vehicle with a slung load, such as a quadrotor drone or the like. To achieve hover condition, the attitude angles and the position have to be stabilized. The outputs of the controller are the set of variables (x, y, z, $\phi$, $\theta$, $\psi$), where x, y and z are three-dimensional Cartesian coordinates, $\phi$ represents roll, $\theta$ represents pitch, and $\psi$ represents yaw. However, selecting all six outputs makes the system under-actuated, as there are only four inputs. Additionally, a coupling problem also exists, thus the output vector in the present method is selected to simply be ($\phi$, $\theta$, $\psi$, z), where the Cartesian z-coordinate represents altitude. Additionally, it should be noted that the drag and gyroscopic terms cannot be neglected, and are each considered in order to achieve complete stability. Thus, the present control method involves double loop architecture, as illustrated in FIG. 1, where the overall controller 10 includes an inner loop having an inner controller 12, which is responsible for controlling the attitude angles and the altitude, and an outer loop having an outer controller 14 is responsible for providing the inner controller 12 with the desired angle values. The inner controller 12 needs to be much faster than the outer controller 14 in order to achieve stability. These four states ($\phi$, $\theta$, $\psi$, z), or three states ($\phi$, $\theta$, z), are selected as outputs and the feedback linearization technique is used. It should be noted that Newton's notation for time derivatives is used herein. For example, $\dot\phi$ represents $$\frac{d\varphi}{dt},$$

where t is time, and $\ddot\phi$ represents $$\frac{d^2\varphi}{dt^2}.$$

In the following, the position of the body frame of an unmanned aerial vehicle (UAV) 104, such as a quadrotor or the like, with respect to the frame of the Earth is denoted by the vector $\xi=[x,y,z]^T$, and the orientation in angular position of the body frame with respect to the Earth frame is denoted by $\eta=[100,\theta,\psi]^T$, which represent pitch, roll and yaw, respectively. The translational and rotational movement of the quadrotor with respect to the Earth inertial frame can be described by using the combined vector $\xi$ and $\eta$; i.e., $q=[\xi^T \eta^T]^T$.

For the system, the inertia matrix is given by $$I = \begin{bmatrix} I_{xx} & 0 & 0 \\ 0 & I_{yy} & 0 \\ 0 & 0 & I_{zz} \end{bmatrix}$$

and the transformation matrix is given by $$W_\eta = \begin{bmatrix} 1 & 0 & -\sin\theta \\ 0 & \cos\varphi & \sin\varphi\cos\theta \\ 0 & -\sin\varphi & \cos\varphi\cos\theta \end{bmatrix}.$$

A matrix is defined such that $M_\eta = W^{\eta T} I W$ or $$M_\eta = \begin{bmatrix} I_{xx} & 0 & -I_{xx}S\theta \\ 0 & I_{yy}C^2\varphi + I_{zz}S^2\varphi & (I_{yy} - I_{zz})C\varphi S\varphi C\theta \\ -I_{xx}S\theta & (I_{yy} - I_{zz})C\varphi S\varphi C\theta & I_{xx}S^2\theta + I_{yy}S^2\varphi C^2\theta + I_{zz}C^2\phi C^2\theta \end{bmatrix},$$

where the following convention is used: S(.) and C(.) represent the sine and cosine functions, respectively.

Further, in what follows, $F_\xi$ and $\tau_\eta$ represent the translational forces and the torques, respectively. The drag is represented by the matrices $D_\eta$ and $D_\xi$, where $k_t$ is the translational drag and $k_r$ is the rotational drag, such that $$D_\eta = k_r I = \begin{bmatrix} k_r & 0 & 0 \\ 0 & k_r & 0 \\ 0 & 0 & k_r \end{bmatrix}$$

and $$D_\xi = k_t I = \begin{bmatrix} k_t & 0 & 0 \\ 0 & k_t & 0 \\ 0 & 0 & k_t \end{bmatrix}.$$

The translational dynamics for the system, discounting the slung load, which will be addressed in detail below, are described by $M_\xi \ddot\xi + G_\xi + D_\xi \dot\xi = R_{BI} u A_1$, where $M_\xi$ is a mass term, such that $$M_\xi = \begin{bmatrix} m & 0 & 0 \\ 0 & m & 0 \\ 0 & 0 & m \end{bmatrix},$$

and $G_\xi$ is a gravitational term, such that $$G_\xi = \begin{bmatrix} 0 \\ 0 \\ mg \end{bmatrix},$$

and $A_1$ is used for simplification, where $$A_1 = \begin{bmatrix} 0 \\ 0 \\ 1 \end{bmatrix}.$$

Similarly, these equations can be used for the rotational dynamics, such that $M_\eta \ddot{\eta} + C_\eta(\eta,\dot{\eta})\dot{\eta} + D_\eta \dot{\eta} = \tau_\eta$, where $$C_\eta(\eta, \dot{\eta}) = \begin{bmatrix} c_{11} & c_{12} & c_{13} \\ c_{21} & c_{22} & c_{23} \\ c_{31} & c_{32} & c_{33} \end{bmatrix},$$

where $c_{11}=0$; $c_{12}=(I_{yy}-I_{zz})(\dot{\theta}C\phi S\phi+\dot{\psi}S^2\phi C\theta)+(I_{zz}-I_{yy})\dot{\psi}C^2\phi C\theta-I_{xx}\dot{\psi}C\theta$; $c_{13}=(I_{zz}-I_{yy})\dot{\psi}C\phi S\phi C^2\theta$; $c_{21}=(I_{zz}-I_{yy})(\dot{\theta}C\phi S\phi+\dot{\psi}S^2\phi C\theta)+(I_{yy}-I_{zz})\dot{\psi}C^2\phi C\theta+I_{xx}\dot{\psi}C\theta$; $c_{22}=(I_{zz}-I_{yy})\dot{\phi}C\phi S\phi$; $c_{23}=-I_{xx}\dot{\psi}S\phi\theta C\theta+I_{yy}\dot{\psi}S^2\phi C\theta S\theta+I_{yy}\dot{\psi}C^2\Phi S\theta C\theta$; $c_{31}=(I_{yy}-I_{zz})\dot{\psi}C\phi S\phi C^2\theta-I_{xx}\dot{\theta}C\theta$; $c_{32}=(I_{zz}-I_{yy})(\dot{\theta}C\phi S\phi\theta+\dot{\psi}S^2\phi C\theta)+(I_{yy}-I_{zz})\dot{\phi}C^2\phi C\theta+I_{xx}\dot{\psi}S\theta C\theta-I_{yy}\dot{\psi}S^2\phi S\theta C\theta-I_{zz}\dot{\psi}C^2\phi S\theta C\theta$; and $c_{33}=(I_{yy}-I_{zz})\dot{\phi}C\phi S\phi C^2\theta-I_{yy}\dot{\theta}S^2\phi S\theta C\theta-I_{zz}\dot{\theta}C^2\phi S\theta C\theta+I_{xx}\dot{\theta}C\theta S\theta$. Combining the rotational and translational matrices yields the overall dynamic equation $M\ddot{q}+C\dot{q}+D\dot{q}+G=\tau$, where M is the inertia matrix, C is the matrix containing the centrifugal and Coriolis terms, D represents the drag term and G is the gravitational matrix.

For ease of understanding, the dynamics may also be represented in the space state format, where p, q and r represent the angular velocities, such that: $\dot{\Phi}=p+q\sin\phi\tan\theta+r\cos\phi\tan\theta$; $\dot{\theta}=q\cos\phi-r\sin\phi$;

$$\dot{\psi} = \frac{q\sin\varphi + r\cos\varphi}{\cos\theta};$$

$$\dot{p} = \frac{-qr(I_{zz}-I_{yy}) - k_r p - I_R q\Omega + \tau_p}{I_{xx}};$$

$$\dot{q} = \frac{-pr(I_{xx}-I_{zz}) - k_r q - I_R p\Omega + \tau_q}{I_{yy}};$$

$$\dot{r} = \frac{-pq(I_{yy}-I_{xx}) - k_r r + \tau_r}{I_{zz}};$$

$\dot{x}=v_x$; $\dot{y}=v_y$; $\dot{z}=v_z$;

$$\dot{v}_x = \frac{(\cos\varphi\sin\theta\cos\psi + \sin\varphi\sin\psi)u - k_t v_x}{m};$$

$$\dot{v}_y = \frac{(\cos\varphi\sin\theta\sin\psi - \sin\varphi\cos\psi)u - k_t v_y}{m};$$

and $\dot{v}_z = \frac{(\cos\varphi\cos\theta)u - k_t v_z - mg}{m}$.

As will be described in greater detail below, the inner loop inner controller 12 utilizes a two layer neural network. Essentially, as will be described in greater detail below, the overall adaptive control method includes the following steps:

(a) establishing a feedback linear controller, such that $f(x)=M_b(\ddot{x}_{a_d}+\Lambda\dot{e}_{x_a})+C_b(\dot{x}_{a_d}+\Lambda e_{x_a})+D_b\dot{x}_a+G_b$, where $f(x)$ is a control dynamics input for an unmanned aerial vehicle, $x_{a_d}$ is a vector representing desired roll, pitch, yaw and altitude for the unmanned aerial vehicle based on a desired corresponding trajectory, $M_b$ is an inertia matrix associated with the unmanned aerial vehicle, $C_b$ is a centrifugal force and coriolis force matrix associated with the unmanned aerial vehicle, $D_b$ is a drag force matrix associated with the unmanned aerial vehicle, and $G_b$ is a gravitational vector, $\dot{x}_a$ being a velocity vector such that $$\dot{x}_a = \begin{pmatrix} \dot{\varphi} \\ \dot{\theta} \\ \dot{\psi} \\ \dot{z} \end{pmatrix},$$

where $\phi$ represents a roll angle of the unmanned aerial vehicle, $\theta$ represents a pitch angle of the unmanned aerial vehicle, $\psi$ represents a yaw angle of the unmanned aerial vehicle, and z represents an altitude of the unmanned aerial vehicle, $e_{x_a}$ representing control error, and $\Lambda$ being a positive definite constant matrix such that $y=\dot{e}_{x_a}+\Lambda e_{x_a}$, where y is a filtered tracking error, and x is a vector defined as $$x = \begin{bmatrix} e_{x_a}^T & \dot{e}_{x_a}^T & x_{a_d}^T & \dot{x}_{a_d}^T & \ddot{x}_{a_d}^T \end{bmatrix}^T,$$

where T is a period of a periodic orbit of the slung load;

(b) establishing a two level neural network such that $f(x)=W^T\sigma(V^Tx)+\epsilon$, where W and V are neural network weights, $\sigma$ represents the sigmoid function, and $\epsilon$ being a known bound;

(c) calculating a neural network estimate of $f(x)$, $\hat{f}(x)$, as $\hat{f}(x)=\hat{W}^T\sigma(\hat{V}^Tx)$, where $\hat{W}$ and $\hat{V}$ are actual values of the neural network weights W and V, respectively, given by a tuning algorithm;

(d) providing a control input $\tau$ for the unmanned aerial vehicle as $\tau=\hat{W}^T\sigma(\hat{V}^Tx)+K_v y$, where $K_v$ is a feedforward gain; and (e) providing additional anti-swing control input to the unmanned aerial vehicle to correct for a slung load as $x_{cor}=K_{xc}L\phi_L(t-\tau_{xc})$ and $y_{cor}=K_{yc}L\phi_L(t-\tau_{yc})$, wherein $x_{cor}$ and $y_{cor}$ are additional longitudinal and lateral displacements, respectively, $K_{xc}$ and $K_{yc}$ are, respectively, longitudinal and lateral feedback gains, L is a load cable length, $\phi_L$ is a load angle in an x-z plane, t is time, and $\tau_{xc}$ and $\tau_{yc}$ are, respectively, longitudinal and lateral time delays introduced in the feedback of the load angle.

For the inner loop inner controller 12, a subsystem of the state variables ($\phi$, $\theta$, $\psi$, p, q, r, z, $\dot{z}$) is considered, where p, q and r are vehicle angular velocities and $\dot{z}$ is the time rate of change of altitude. The dynamics of these can be expressed as:

$$\dot{\bar{x}}=f(\bar{x})+h(\bar{x})u_h. \qquad (17)$$

The dynamics of the selected outputs are:

$$\dot{x}_a = \begin{pmatrix} \dot{\varphi} \\ \dot{\theta} \\ \dot{\psi} \\ \dot{z} \end{pmatrix} = \begin{bmatrix} p + q\sin\varphi\tan\theta + r\cos\varphi\tan\theta \\ q\cos\varphi - r\sin\varphi \\ \frac{1}{\cos\theta}[q\sin\varphi + r\cos\varphi] \\ v_z \end{bmatrix}. \quad (18)$$

It can be seen that the dynamic of the selected state variables is independent of $u_h$, and this is helpful in computing the second derivative. This is denoted as:

$$\hat{f}(\bar{x}) = \begin{bmatrix} p + q\sin\varphi\tan\theta + r\cos\varphi\tan\theta \\ q\cos\varphi - r\sin\varphi \\ \frac{1}{\cos\theta}[q\sin\varphi + r\cos\varphi] \\ \dot{z} \end{bmatrix}. \quad (19)$$

Computing the second derivative of the outputs yields:

$$\ddot{x}_a = \frac{d\hat{f}(\bar{x})}{dt} = \frac{\partial \hat{f}(\bar{x})}{\partial \bar{x}} \dot{\bar{x}} = \frac{\partial \hat{f}(\bar{x})}{\partial \bar{x}} f(\bar{x}) + \frac{\partial \hat{f}(\bar{x})}{\partial \bar{x}} h(\bar{x}) u_h. \quad (20)$$

The Jacobian matrix is defined as:

$$J(\bar{x}) = \frac{\partial \hat{f}(\bar{x})}{\partial \bar{x}}. \quad (21)$$

Substitution of the Jacobian into equation (20) yields:

$$\ddot{x}_a = J(\bar{x})f(\bar{x}) + J(\bar{x})h(\bar{x})u_h. \quad (22)$$

Letting $\varphi_d$, $\theta_d$, $\psi_d$ and $z_d$ be the desired outputs, denoted as $x_{a_d}$, then the error is defined as:

$$e_\varphi = \varphi - \varphi_d \quad (23)$$

$$e_\theta = \theta - \theta_d \quad (24)$$

$$e_\psi = \psi - \psi_d \quad (25)$$

$$e_z = z - z_d. \quad (26)$$

The control inputs can be written as:

$$\begin{bmatrix} \tau_p^* \\ \tau_q^* \\ \tau_r^* \\ u^* \end{bmatrix} = \quad (27)$$

$$-(J(\bar{x})h(\bar{x}))^{-1}J(\bar{x})f(\bar{x}) - (J(\bar{x})h(\bar{x}))^{-1}[Kd_i \dot{e}_{x_a} + Kp_i e_{x_a} - \ddot{x}_{a_d}],$$

where $Kp_i$ and $Kd_i$ are positive, so that the error dynamics can be written as a stable second order dynamics. The desired values $\psi_d$ and $z_d$ are selected as per the choice of the specific mission. However, the desired values $\psi_d$ and $\theta_d$ are given to the inner loop inner controller 12 by the outer loop outer controller 14, so that the position x and y are also stabilized.

To estimate the gyroscopic torque term, the propeller speeds must be estimated. These are given by the following relation of the inputs with the propeller speeds:

$$\begin{bmatrix} \tau_p \\ \tau_q \\ \tau_r \\ u \end{bmatrix} = \begin{bmatrix} 0 & -l & 0 & l \\ l & 0 & -l & 0 \\ d & -d & d & -d \\ 1 & 1 & 1 & 1 \end{bmatrix} \begin{bmatrix} f_1^2 \\ f_2^2 \\ f_3^2 \\ f_4^2 \end{bmatrix}. \quad (28)$$

The propeller speeds are then estimated by inverting the matrix and taking a square root. After this, $\Omega$ is estimated as:

$$\Omega = \Omega_1 \Omega_2 + \Omega_3 - \Omega_4. \quad (29)$$

This aids in estimating the gyroscopic torque and, thus, the controller stabilizes the quadrotor with these torques acting on it. This may also be written as a set of dynamic equations of selected outputs $x_a$:

$$M_{x_a}\ddot{x}_a + C_{x_a}\dot{x}_a + D_{x_a}\dot{x}_a + G = B_{x_a}\tau_{x_a}, \quad (30)$$

where $$B_{x_a} = \begin{bmatrix} 1 & 0 & 0 & 0 \\ 0 & 1 & 0 & 0 \\ 0 & 0 & 1 & 0 \\ 0 & 0 & 0 & \cos\varphi\cos\theta \end{bmatrix}. \quad (31)$$

Pre-multiplying both sides of the above by the inverse of the input matrix $B_{x_a}$, the equation now becomes:

$$M_b \ddot{x}_a + C_b \dot{x}_a + D_b \dot{x}_a + G_b = \tau_{x_a}, \quad (32)$$

where $M_b = B_{x_a} M_{x_a}$, $C_b = B_{x_a} C_{x_a}$, $D_b = B_{x_a} D_{x_a}$ and $G_b = B_{x_a} G$. The filtered tracking error is defined as:

$$y = \dot{e}_{x_a} + \Lambda e_{x_a}, \quad (33)$$

where $\Lambda$ is a positive definite constant matrix. Then, the FLC is given by:

$$\tau_{x_a} = K_v y + M_b(\ddot{x}_a + \Lambda \dot{e}_{x_a}) + C_b(\dot{x}_a + \Lambda e_{x_a}) + D_b \dot{x}_a + G_b, \quad (34)$$

where $K_v$ is a positive diagonal design matrix. As long as the filtered error y is bounded, the error remains bounded.

For the outer loop outer controller 14, the motion of the quadrotor in the horizontal direction is due to the horizontal components of the thrust forces. The roll and pitch angles are important for the horizontal components of the thrust forces and, therefore, to reach a desired position for x and y, desired values of $\varphi_d$ and $\theta_d$ are to be generated by the outer loop. Further, the inner loop inner controller 12 must be much faster than the outer loop outer controller 14 for the overall control structure to be stable. Considering a subsystem of the states (x, y, $\dot{x}$, $\dot{y}$) and letting $\varphi_d$ and $\theta_d$ be small angles, then:

$$\begin{bmatrix} \varphi_d \\ \theta_d \end{bmatrix} = -\frac{m}{u} \begin{bmatrix} S_\psi & -C_\psi \\ C_\psi & S_\psi \end{bmatrix} \times \begin{bmatrix} -\frac{k_t}{m}\dot{x} + Kd_0 e_{\dot{x}} + Kp_0 e_x - \ddot{x}_d \\ -\frac{k_t}{m}\dot{y} + Kd_0 e_{\dot{y}} + Kp_0 e_y - \ddot{y}_d \end{bmatrix}, \quad (35)$$

where $Kd_0$ and $Kp_0$ are both positive constants and give a stable second order error dynamics for the horizontal displacement. These desired values of $\varphi_d$ and $\theta_d$ are the desired inputs to the inner controller. Therefore, the inner controller 12 stabilizes the quadrotor at a desired altitude and yaw angle and then the outer loop outer controller 14 stabilizes it to a desired location in the x and y directions.

A two-layered neural network (NN) is used for function approximation. The advantage of this two layered NN is that it does not require any pre-selection of a basis set. Further, the restriction of linearity in parameters is overcome. The first layer weights allow the NN to train its own basis set for the system non-linearities. These weights are tuned by different algorithms, but the algorithm used in the present method is back propagation with a modified tuning algorithm. No preliminary offline training is required in this type of NN and, further, the problem of net weight initialization is not a matter of concern in this approach. The initial weight updates are selected as zero. While the weights are trained online in real time, the proportional derivative (PD) tracking loop carries out its tracking, keeping the error small. When the NN gets trained, the tracking error reduces. The modification in the tuning algorithm is done to improve robustness to disturbances and estimation errors.

Figure 2:
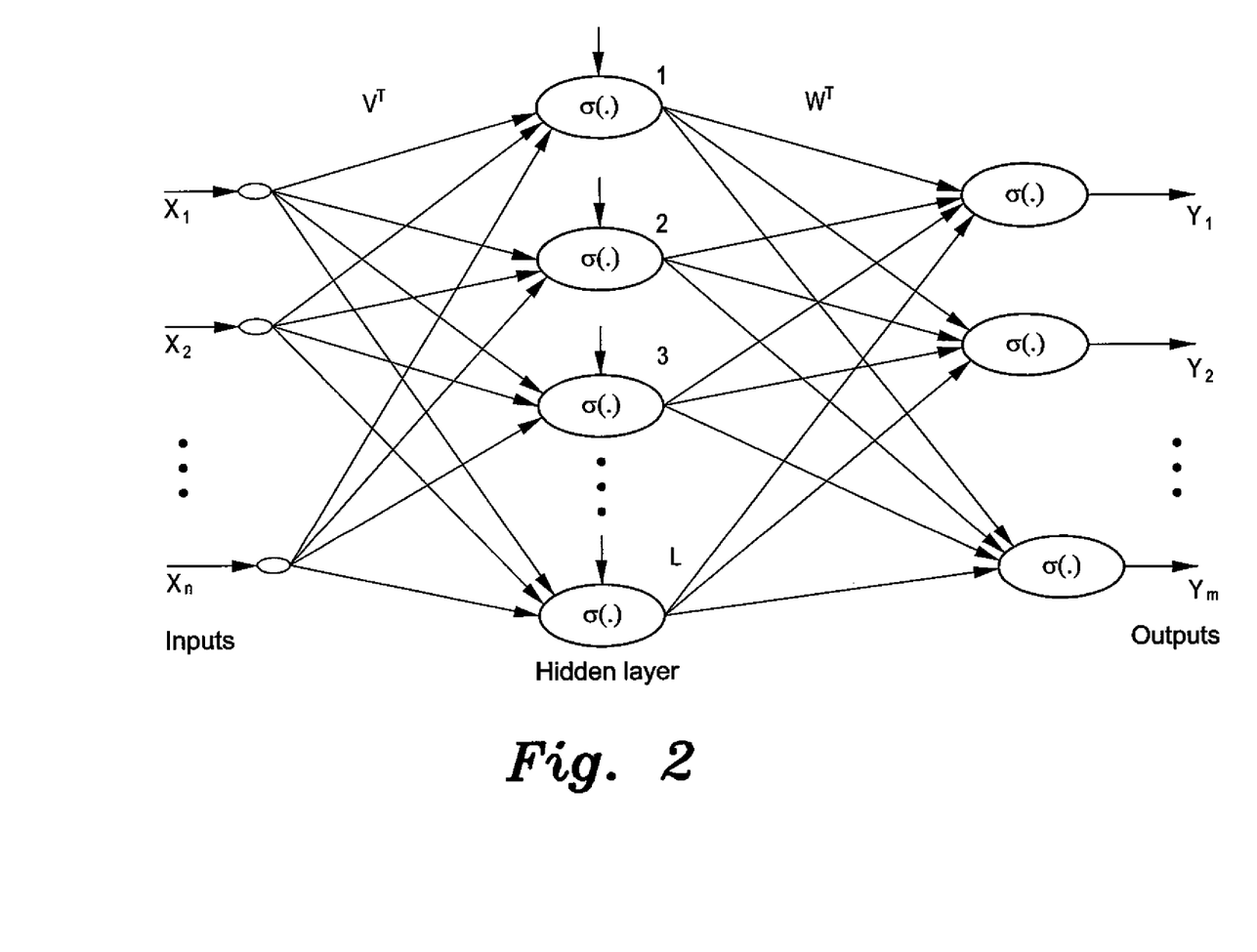
FIG. 2 diagrammatically illustrates an embodiment of a neural network (NN) architecture used in embodiments of an adaptive control method for an unmanned aerial vehicle with a slung load according to the present invention.

The architecture of the neural network used in the present method is show in FIG. 2, where σ(.) is the activation function, and can any one of a hard limit, a linear threshold, a hyperbolic tangent, a radial basis function, etc., and V and W are the weights of the respective layers. The activation function is selected depending upon different applications. The purpose of the activation function is to model the behavior of the cell where there is no output below a certain value of the argument of σ(.) and the output takes a specified magnitude above that value. A general class of monotonously, non-decreasing functions taking on bounded values at +∞ and −∞ is known as the sigmoid function, given as $$\sigma(.) = \frac{1}{1+e^{-x}}.$$

It is possible to construct the NN with multiple hidden layers, however the computational load increases with the number of hidden layers and the number of neurons. A simple NN with two layers can form the most the complex decisions for classifications. Thus, a two layer NN is sufficient to perform all the estimations in many applications. The use of additional layers will only complicate and increase the computational load, which is undesirable. Thus, a two layer NN is selected to increase the speed of computation.

The unmanned aerial vehicle (UAV) 104 inner loop inner controller 12 can be described by:

$$M_b \ddot{x}_a + C_b \dot{x}_a + D_b \dot{x}_a + G_b = \tau. \quad (36)$$

The tracking error and the filtered tracking error are defined by $e_{x_a} = x_{a_d} - x_a$, $y = \dot{e}_{x_a} + \Lambda e_{x_a}$, thus the dynamics, in terms of the filtered error, can be expressed as:

$$M_b \dot{y} = -C_b y + f(x) - \tau, \quad (37)$$

where the unknown nonlinear UAV dynamics are defined as:

$$f(x) = M_b(\ddot{x}_{a_d} + \Lambda \dot{e}_{x_a}) + C_b(\dot{x}_{a_d} + \Lambda e_{x_a}) + D_b \dot{x}_a + G_b. \quad (38)$$

Here, the vector x can be defined as:

$$x = \begin{bmatrix} e_{x_a}^T & \dot{e}_{x_a}^T & x_{a_d}^T & \dot{x}_{a_d}^T & \ddot{x}_{a_d}^T \end{bmatrix}^T. \quad (39)$$

According to the universal approximation property of NNs, there is a two layer NN such that:

$$f(x) = W^T \sigma(V^T x) + \varepsilon, \quad (40)$$

with the approximation error bounded on a compact set by:

$$\|\varepsilon\| < \varepsilon_N, \quad (41)$$

with the ε a known bound. W and V are the ideal weights which provide good approximation to f(x) and they are unknown. All that is needed is that they exist and there is also no restriction that they have to be unique. Defining the matrix with the neural network weights as:

$$Z = \begin{bmatrix} W & 0 \\ 0 & V \end{bmatrix}, \quad (42)$$

then the number of hidden layer neurons is selected by running trials until a good performance is achieved. In a simulation performed, the number of neurons was selected as 10, for example.

It is assumed that on any compact subset of $R^n$, the ideal NN weights are bounded so that:

$$\|Z\| \leq Z_B, \quad (43)$$

where $Z_B$ is known. Letting an NN estimate of f(x) be given by $$\hat{f}(x) = \hat{W}^T \sigma(\hat{V}^T x) \quad (44)$$

with $\hat{W}$ and $\hat{V}$ being the actual values of the NN weights given by the tuning algorithm, then these are estimates of the ideal weights, and the weight deviation or weight estimation error is defined as:

$$\tilde{V} = V - \hat{V} \quad (45a)$$

$$\tilde{W} = W - \hat{W} \quad (45b)$$

$$\tilde{Z} = Z - \hat{Z}. \quad (45c)$$

The linearity in parameters restriction is overcome by providing tuning algorithms which appear in a non-linear fashion. The hidden layer output error for a given x is given by:

$$\tilde{\sigma} = \sigma - \hat{\sigma} = \sigma(V^T x) - \sigma(\hat{V}^T x). \quad (46)$$

The Taylor series expansion of σ(x) for a given x can be written as:

$$\sigma(V^T x) = \sigma(\hat{V}^T x) + \sigma'(\hat{V}^T x) \tilde{V}^T x + 0(\tilde{V}^T x)^2, \quad (47)$$

where $$\sigma'(\hat{z}) = \left. \frac{d\sigma(z)}{dz} \right|_{z=\hat{z}} \quad (48)$$

$$\tilde{\sigma} = \hat{\sigma}' \tilde{V}^T x + 0(\tilde{V}^T x)^2 \quad (49)$$

and $O(z)^2$ denotes terms of second order. This equation is very important, since the non-linear term in $\hat{V}$ is replaced by a linear term and higher order terms. This allows derivation of the tuning algorithm for $\tilde{V}$. The control input is now selected as:

$$\tau = \hat{W}^T \sigma(\hat{V}^T x) + K_v y, \quad (50)$$

where $K_v$ is the feedforward gain, which is selected by the designer. The NN weight tuning algorithms are given by:

$$\dot{\hat{W}} = F \hat{\sigma} y^T \text{ and} \quad (51)$$

$$\dot{\hat{V}} = G x (\hat{\sigma}'^T \hat{W} y)^T, \quad (52)$$

where the design parameters F and G are positive definite matrices.

Letting the desired trajectory be bounded by a known bound, and the NN weights also bounded by a known assumption and with the weight tuning algorithms provided above with any constant matrices $F = F^T > 0$ and $G = G^T > 0$, then the filtered error y(t) and the NN weight estimates $\hat{V}$ and $\hat{W}$ are uniformly ultimately bounded. Moreover, the tracking error can be kept very small by proper selection of $K_v$.

The conversion of the NN estimates to the actual angular velocity of the rotor (i.e., the input) is performed as: a) provide the error and reference trajectory and its derivatives; b) provide the weights V and W in the layers of the NN to form f(x); c) update the weights online to give $\hat{f}(x)$, where $\hat{f}(x)$ is the estimate of the dynamics, which is used to obtain the torques τ, which are related to the lifting forces $f_i$ of the propellers; and d) the $f_i$ values are related to the angular speed.

Time-delayed feedback control, or time-delay autosynchronization, constructs a control value from the difference of the present state of a given system to its delayed value, i.e., $s(t)-s(t-\tau_{cor})$. By proper selection of the time delay $\tau_{cor}$, the control value vanishes if the state to be stabilized converges. Thus, this method is noninvasive. This feedback scheme is easy to implement in an experimental setup and numerical calculation. It is capable of stabilizing fixed points as well as periodic orbits, even if the dynamics are very fast. Also, from a mathematical perspective, it is an appealing instrument, since the corresponding equations fall in the class of delay differential equations.

A very minimal knowledge of the system is required. The only quantity of the system that needs to be known is the period T of the periodic orbit of the slung load, which determines the choice of the time delay. Instead of time-delayed feedback, it is tempting to use proportional feedback, where the control is given by the difference of the current state to the desired state, however this is a complicated process and is numerically exhaustive. Time-delayed feedback has been successfully employed in the context of chaos control, for example.

The time-delayed feedback gives a correction trajectory which adds to the reference trajectory. This correction trajectory is given by the equations:

$$x_{cor}=K_{xc}L\phi_L(t-\tau_{xc}) \text{ and} \qquad (53)$$

$$y_{cor}=K_{yc}L\theta_L(t-\tau_{yc}). \qquad (54)$$

These two trajectories act as anti-trajectories to the load angles, and these are added to the reference tracking trajectories of the UAV 104. This helps in stabilizing the load angles. The parameters are $K_{xc}$, $K_{yc}$, $\tau_{xc}$ and $\tau_{yc}$. The feedback gain and the time delay are selected accordingly to stabilize the angles as fast as possible. The optimal values of these can, however, be selected by using optimization algorithms. The values of the gains are selected as $K_{xc}=K_{yc}=0.4L$, and the time delay is selected as $\tau_{xc}=\tau_{yc}=0.32T_L$, where $T_L$ is given by $$T_L = \frac{2\pi}{\sqrt{a/L}}$$

and is the period of oscillation of the suspended load.

With regard to fault tolerant control, a case of failure of one rotor is considered. An assumption is made that a Fault Detection and Isolation (FDI) module is present, which detects and isolates the faults whenever they occur. For example, if rotor #2 fails and there is no lifting force provided by it, then the quadrotor is left with only three rotors to provide the thrust and movement. The rotor on the same axis (which is rotor #4) is controlled until the pitch angle becomes zero. This leaves the quadrotor with only two rotors spinning in one direction, thus making the quadrotor rotate about its vertical axis or in the yaw angle. This is acceptable because the other attitude angles and the altitude are stabilized. The outputs will be (x, y, z, φ, θ). The angle ψ is the yaw angle and it is compromised in the control strategy, so it will not be considered as the output. The control method involves a double loop architecture, where the inner loop inner controller 12 is responsible to control the attitude angles φ and θ and the altitude z, and the outer loop outer controller 14 is responsible for providing the inner loop inner controller 12 with the desired angle values $\phi_d$ and $\theta_d$. Three states (φ, θ, z) are selected as outputs, and feedback linearization is used. Below, the convention $o_f$ represents a fault condition. The input vector is:

$$u_f = \begin{bmatrix} u \\ \tau_q \\ \tau_r \end{bmatrix}. \qquad (55)$$

The above procedure, which was developed for normal operation, is used, except that the angle is not controlled and the input $\tau_p$ is calculated as:

$$\tau_p = \frac{l}{2}\left(u - \frac{\tau_r}{d}\right). \qquad (56)$$

Figure 3:
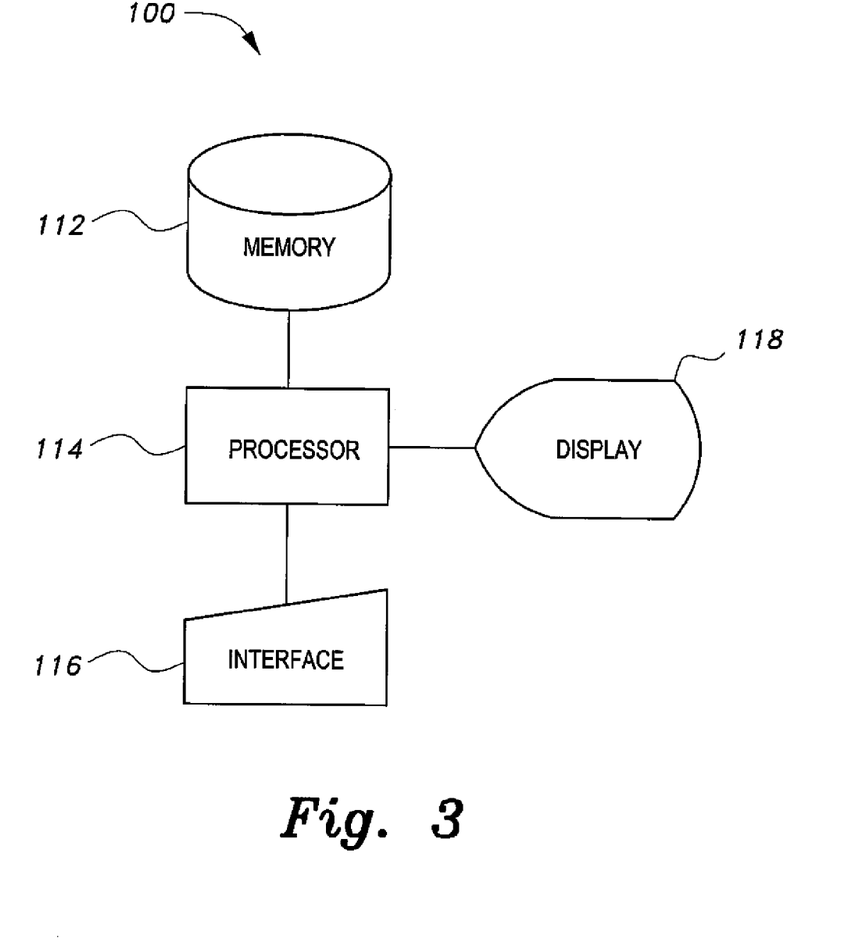
FIG. 3 is a block diagram illustrating system components for implementing embodiments of an adaptive control method for an unmanned aerial vehicle with a slung load according to the present invention.

It should be understood that the calculations and sets of instructions can be performed by any suitable computer system, such as that diagrammatically shown in FIG. 3. Data and instructions for embodiments of adaptive control for an unmanned vehicle with a slung load, such as for the UAV 104 with a slung load, is/are entered into a controller 100, such as the overall controller 10 including the inner controller 12 and the outer controller 14, via any suitable type of interface 116, and can be stored in memory 112, which can be any suitable type of computer readable and programmable memory and is desirably a non-transitory, computer readable storage medium. Calculations are performed by a processor 114, which can be any suitable type of computer processor and can be displayed to a user on a display 118, which can be any suitable type of computer display or other type of suitable display, such as a light emitting diode (LED) display.

The processor 114 can be associated with, or incorporated into, any suitable type of computing device, for example, a personal computer, a programmable logic controller (PLC) or an application specific integrated circuit (ASIC), for example. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that can be used in addition to the memory 112, or in place of the memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It is to be understood that the present invention is not limited to the embodiments described above, but encompasses any and all embodiments within the scope of the following claims.

We claim:
1. An adaptive control method for an unmanned vehicle with a slung load, comprising the steps of:
establishing a feedback linear controller, such that $f(x)=M_b(\ddot{x}_{a_d}+\Lambda\dot{e}_{x_a})+C_b(\dot{x}_{a_d}+\Lambda e_{x_a})+D_b\dot{x}_a+G_b$, wherein f(x) is a control dynamics input for an unmanned aerial vehicle, $x_{a_d}$ is a vector representing roll, pitch, yaw and altitude for the unmanned aerial vehicle based on a corresponding trajectory, $M_b$ is an inertia matrix associated with the unmanned aerial vehicle, $C_b$ is a centrifugal force and coriolis force matrix associated with the unmanned aerial vehicle, $D_b$ is a drag force matrix associated with the unmanned aerial vehicle, and $G_b$ is a gravitational vector, $\dot{x}_a$ being a velocity vector such that

$$\dot{x}_a = \begin{pmatrix} \dot{\varphi} \\ \dot{\theta} \\ \dot{\psi} \\ \dot{z} \end{pmatrix},$$

where φ represents a roll angle of the unmanned aerial vehicle, θ represents a pitch angle of the unmanned aerial vehicle, ψ represents a yaw angle of the unmanned aerial vehicle, and z represents an altitude of the unmanned aerial vehicle, $e_{x_a}$ representing control error, and Λ being a positive definite constant matrix such that $y=\dot{e}_{x_a}+\Lambda e_{x_a}$, where y is a filtered tracking error, and x is a vector defined as $$x = [e_{x_a}^T \; \dot{e}_{x_a}^T \; x_{a_d}^T \; \dot{x}_{a_d}^T \; \ddot{x}_{a_d}^T]^T,$$

where T is a period of a periodic orbit of the slung load;
establishing a two level neural network such that $f(x)=W^T\sigma(V^Tx)+\epsilon$, where W and V are neural network weights, σ represents the sigmoid function, and ε being a known bound;
calculating a neural network estimate of f(x), $\hat{f}(x)$, as $\hat{f}(x)=\hat{W}^T\sigma(\hat{V}^Tx)$, where $\hat{W}$ and $\hat{V}$ are actual values of the neural network weights W and V, respectively, given by a tuning algorithm;
transmitting a control input τ for the unmanned aerial vehicle as $\tau=\hat{W}^T\sigma(\hat{V}^Tx)+K_vy$, where $K_v$ is a feedforward gain, for controlling flight of the unmanned aerial vehicle; and
transmitting additional anti-swing control input to the unmanned aerial vehicle to correct for a slung load as $x_{cor}=K_{xc}L\phi_L(t-\tau_{xc})$ and $y_{cor}=K_{yc}L\phi_L(t-\tau_{yc})$, wherein $x_{cor}$ and $y_{cor}$ are additional longitudinal and lateral displacements, respectively, $K_{xc}$ and $K_{yc}$ are, respectively, longitudinal and lateral feedback gains, L is a load cable length, $\phi_L$ is a load angle in an x-z plane, t is time, and $\tau_{xc}$ and $\tau_{yc}$ are, respectively, longitudinal and lateral time delays introduced in the feedback of the load angle.

2. The adaptive control method for an unmanned vehicle with a slung load as recited in claim 1, wherein the tuning algorithm comprises calculating $\hat{W}$ and $\hat{V}$, respectively, as $\dot{\hat{W}}=F\hat{\sigma}y^T$ and $\dot{\hat{V}}=Gx(\hat{\sigma}'^T\hat{W}y)^T$, where F and G are each positive definite matrices representing design parameters.

3. The adaptive control method for an unmanned vehicle with a slung load as recited in claim 2, wherein $K_{xc}=K_{yc}=0.4L$, and $\tau_{xc}=\tau_{yc}=0.32T_L$, where $T_L$ is a period of oscillation of the slung load.

4. A computer software product that includes a non-transitory storage medium readable by a processor, the non-transitory storage medium having stored thereon a set of instructions for performing adaptive control for an unmanned vehicle with a slung load, the instructions comprising:
(a) a first set of instructions which, when loaded into main memory and executed by the processor, causes the processor to establish a feedback linear controller, such that $f(x)=M_b(\ddot{x}_{a_d}+\Lambda\dot{e}_{x_a})+C_b(\dot{x}_{a_d}+\Lambda e_{x_a})+D_b\dot{x}_a+G_b$, wherein f(x) is a control dynamics input for an unmanned aerial vehicle, $x_{a_d}$ is a vector representing roll, pitch, yaw and altitude for the unmanned aerial vehicle based on a corresponding trajectory, $M_b$ is an inertia matrix associated with the unmanned aerial vehicle, $C_b$ is a centrifugal force and coriolis force matrix associated with the unmanned aerial vehicle, $D_b$ is a drag force matrix associated with the unmanned aerial vehicle, and $G_b$ is a gravitational vector, $\dot{x}_a$ being a velocity vector such that $$\dot{x}_a = \begin{pmatrix} \dot{\varphi} \\ \dot{\theta} \\ \dot{\psi} \\ \dot{z} \end{pmatrix},$$

where φ represents a roll angle of the unmanned aerial vehicle, θ represents a pitch angle of the unmanned aerial vehicle, ψ represents a yaw angle of the unmanned aerial vehicle, and z represents an altitude of the unmanned aerial vehicle, $e_{x_a}$ representing control error, and Λ being a positive definite constant matrix such that $y=\dot{e}_{x_a}+\Lambda e_{x_a}$, where y is a filtered tracking error, and x is a vector defined as $$x = [e_{x_a}^T \; \dot{e}_{x_a}^T \; x_{a_d}^T \; \dot{x}_{a_d}^T \; \ddot{x}_{a_d}^T]^T,$$

where T is a period of a periodic orbit of the slung load;
(b) a second set of instructions which, when loaded into main memory and executed by the processor, causes the processor to establish a two level neural network such that $f(x)=W^T\sigma(V^Tx)+\epsilon$, where W and V are neural network weights, σ represents the sigmoid function, and ε being a known bound;
(c) a third set of instructions which, when loaded into main memory and executed by the processor, causes the processor to calculate a neural network estimate of f(x), $\hat{f}(x)$, as $\hat{f}(x)=\hat{W}^T\sigma(\hat{V}^Tx)$, where $\hat{W}$ and $\hat{V}$ are actual values of the neural network weights W and V, respectively, given by a tuning algorithm;
(d) a fourth set of instructions which, when loaded into main memory and executed by the processor, causes the processor to transmit a control input τ for the unmanned aerial vehicle as $\tau=\hat{W}^T\sigma(\hat{V}^Tx)+K_vy$, where $K_v$ is a feedforward gain, for controlling flight of the unmanned aerial vehicle; and
(e) a fifth set of instructions which, when loaded into main memory and executed by the processor, causes the processor to transmit additional anti-swing control input to the unmanned aerial vehicle to correct for a slung load as $x_{cor}=K_{xc}L\phi_L(t-\tau_{xc})$ and $y_{cor}=K_{yc}L\phi_L(t-\tau_{yc})$, wherein $x_{cor}$ and $y_{cor}$ are additional longitudinal and lateral displacements, respectively, $K_{xc}$ and $K_{yc}$ are, respectively, longitudinal and lateral feedback gains, L is a load cable length, $\tau_L$ is a load angle in an x-z plane, t is time, and $\tau_{xc}$ and $\tau_{yc}$ are, respectively, longitudinal and lateral time delays introduced in the feedback of the load angle.

5. The computer software product as recited in claim 4, wherein the third set of instructions further comprises calculating $\hat{W}$ and $\hat{V}$, respectively, as $\dot{\hat{W}}=F\hat{\sigma}y^T$ and $\dot{\hat{V}}=Gx(\hat{\sigma}'^T\hat{W}y)^T$, where F and G are each positive definite matrices representing design parameters.

6. The computer software product as recited in claim 5, wherein $K_{xc}=K_{yc}=0.4L$, and $\tau_{xc}=\tau_{yc}=0.32T_L$, where $T_L$ is a period of oscillation of the slung load.

* * * * *